(12) United States Patent
Napieralski et al.

(10) Patent No.: US 10,577,227 B1
(45) Date of Patent: Mar. 3, 2020

(54) PORTABLE GANTRY CRANE FORMED OF COMPOSITE MEMBERS

(71) Applicant: Oz Lifting Products, LLC, Winona, MN (US)

(72) Inventors: Steve Napieralski, Winona, MN (US); Gregory Lucas, La Crescent, MN (US)

(73) Assignee: OZ Lifting Products, LLC, Winona, MN (US)

( * ) Notice: Subject to any disclaimer, the term of this patent is extended or adjusted under 35 U.S.C. 154(b) by 54 days.

(21) Appl. No.: 15/382,609

(22) Filed: Dec. 17, 2016

Related U.S. Application Data

(62) Division of application No. 14/168,696, filed on Jan. 30, 2014, now Pat. No. 9,630,816.
(Continued)

(51) Int. Cl.
*B66C 17/00* (2006.01)
*F16M 13/00* (2006.01)
(Continued)

(52) U.S. Cl.
CPC .............. *B66C 17/00* (2013.01); *B66C 5/00* (2013.01); *B66C 19/00* (2013.01); *F16M 11/045* (2013.01);
(Continued)

(58) Field of Classification Search
CPC ........... B66C 17/00; B66C 19/00; B66C 5/00; F16M 11/26; F16M 11/42; F16M 13/00
(Continued)

(56) References Cited

U.S. PATENT DOCUMENTS

| 488,349 A | * | 12/1892 | Bradley | ..................... E04B 1/19 52/654.1 |
| 714,554 A | * | 11/1902 | Augustus | ................... A45F 3/24 135/87 |

(Continued)

FOREIGN PATENT DOCUMENTS

| DE | 19747123 | 5/1999 |
| EP | 2497910 | 9/2012 |

(Continued)

OTHER PUBLICATIONS

Thern Portable Davit Crane, published online at least as early as Dec. 30, 2011, available at http://www.thern.com/products/cranes/portable-davit-crane/, last accessed Dec. 31, 2013.
(Continued)

*Primary Examiner* — Eret C McNichols
(74) *Attorney, Agent, or Firm* — Adam R. Stephenson, Ltd.

(57) ABSTRACT

A portable gantry crane formed of composite members includes a composite material I-beam. Two or more support members are formed of a composite material and each support member supports the I-beam when the portable gantry crane is in an upright position. Two or more end housings are included, each end housing enclosing a top end of one of the two or more support members and coupled thereto using adhesive. A plurality of latch structures are coupled with the I-beam, each latch structure including a latch, and each end housing having a latch receiver, each latch in combination with a latch receiver allowing one of the latch structures to be releasably fixedly coupled with an end housing. In implementations a plurality of latch structures are coupled with the I-beam, each latch structure having a latch structure enclosure and each latch structure
(Continued)

enclosure at least partially enclosing one of the end housings.

18 Claims, 10 Drawing Sheets

Related U.S. Application Data

(60) Provisional application No. 61/776,018, filed on Mar. 11, 2013.

(51) Int. Cl.
    *F16M 11/04*     (2006.01)
    *F16M 11/26*     (2006.01)
    *F16M 11/42*     (2006.01)
    *B66C 19/00*     (2006.01)
    *B66C 5/00*     (2006.01)
    *B66C 23/16*     (2006.01)

(52) U.S. Cl.
    CPC ............. *F16M 11/26* (2013.01); *F16M 11/42* (2013.01); *F16M 13/00* (2013.01); *B66C 23/166* (2013.01)

(58) Field of Classification Search
    USPC .......................................................... 212/315
    See application file for complete search history.

(56) References Cited

U.S. PATENT DOCUMENTS

| | | | | |
|---|---|---|---|---|
| 841,737 | A | * | 1/1907 | Taylor ..................... B66C 17/00 212/315 |
| 850,439 | A | * | 4/1907 | Morgan ................. B66C 17/00 212/315 |
| 1,147,668 | A | * | 7/1915 | Anderson ................ B25H 1/06 182/185.1 |
| 1,408,675 | A | * | 3/1922 | Wimberg .............. B25B 1/2484 182/185.1 |
| 1,719,440 | A | * | 7/1929 | Nathan ..................... A45F 3/24 182/181.1 |
| 1,725,168 | A | * | 8/1929 | Willis ...................... E04G 1/34 182/108 |
| 2,410,330 | A | * | 10/1946 | Ashenfelter ............. B25H 1/06 182/182.1 |
| 2,672,990 | A | | 3/1954 | Sundin |
| 2,995,094 | A | * | 8/1961 | Wallace .................. B66C 19/02 104/126 |
| 3,081,883 | A | * | 3/1963 | Minty .................. B66C 19/00 180/6.48 |
| 3,092,826 | A | * | 6/1963 | Klingner ................. E01F 13/02 248/166 |
| 3,301,416 | A | | 1/1967 | Bopp |
| 3,390,657 | A | * | 7/1968 | Schneider ............... B63B 27/12 114/260 |
| 3,433,366 | A | * | 3/1969 | White ................... B66C 19/002 188/203 |
| 3,826,196 | A | * | 7/1974 | Wallace .................. B66C 19/02 104/126 |
| 3,961,712 | A | * | 6/1976 | Bartley ................... B66C 17/00 212/315 |
| 3,978,989 | A | | 9/1976 | Avila, Jr. |
| 4,069,922 | A | | 1/1978 | Hawkins |
| 4,090,625 | A | | 5/1978 | Walters |
| 4,127,200 | A | | 11/1978 | Mann |
| 4,256,300 | A | * | 3/1981 | Boucher .................. A63G 9/00 182/155 |
| 4,334,480 | A | * | 6/1982 | Wallace .................. B66C 19/02 104/126 |
| 4,388,037 | A | | 6/1983 | Suarez |
| 4,508,233 | A | | 4/1985 | Helms |
| 4,560,074 | A | | 12/1985 | Manning |
| 4,679,653 | A | | 7/1987 | Pasquarette, Jr. et al. |
| 4,688,688 | A | | 8/1987 | Volakakis et al. |
| 4,690,376 | A | * | 9/1987 | Duncan ..................... A63B 6/00 254/327 |
| 4,718,563 | A | * | 1/1988 | Ellgass ................... E01F 9/688 116/63 P |
| 4,730,743 | A | * | 3/1988 | Rosman .................. B66C 17/00 212/287 |
| 4,861,219 | A | * | 8/1989 | Mayle ....................... B62B 3/04 212/202 |
| 4,877,206 | A | * | 10/1989 | Barrett ................... B67D 7/845 104/126 |
| 4,881,864 | A | | 11/1989 | Amato |
| 4,925,039 | A | | 5/1990 | Macris |
| 5,029,717 | A | | 7/1991 | Chambers |
| 5,052,566 | A | | 10/1991 | Ziegler |
| 5,205,700 | A | | 4/1993 | Lin et al. |
| 5,211,526 | A | | 5/1993 | Robinette |
| 5,375,963 | A | | 12/1994 | Wohlwend |
| 5,431,526 | A | | 6/1995 | Peterson et al. |
| 5,445,487 | A | | 8/1995 | Koscinski, Jr. |
| 5,509,638 | A | | 4/1996 | Leon-Vieito |
| 5,653,351 | A | * | 8/1997 | Grout ..................... B66C 19/00 212/315 |
| 5,669,518 | A | * | 9/1997 | Kundel ..................... B66C 7/02 104/94 |
| 5,752,799 | A | | 5/1998 | Carey et al. |
| 5,791,858 | A | | 8/1998 | Sasser |
| 5,853,282 | A | | 12/1998 | Bechler et al. |
| 5,924,660 | A | * | 7/1999 | Marron .................... B25H 1/06 248/163.1 |
| 5,993,137 | A | | 11/1999 | Harr |
| 6,007,289 | A | | 12/1999 | Kruse et al. |
| 6,009,927 | A | * | 1/2000 | Peters ................. A47G 27/0487 156/574 |
| 6,042,328 | A | | 3/2000 | McVaugh |
| 6,059,071 | A | * | 5/2000 | Appezzato ............... B25H 1/06 182/181.1 |
| 6,095,349 | A | | 8/2000 | O'Meara |
| 6,131,749 | A | * | 10/2000 | Crockett ................... B60R 7/10 211/105.3 |
| 6,138,991 | A | | 10/2000 | Myers, Jr. |
| 6,152,675 | A | | 11/2000 | Compton |
| 6,161,807 | A | * | 12/2000 | Steiner ................. F16M 11/046 182/181.1 |
| 6,170,802 | B1 | | 1/2001 | Stovall |
| 6,189,866 | B1 | | 2/2001 | Harkins et al. |
| 6,202,868 | B1 | | 3/2001 | Murray |
| 6,226,955 | B1 | | 5/2001 | Lorrigan |
| 6,250,483 | B1 | | 6/2001 | Frommer |
| 6,386,820 | B1 | | 5/2002 | Cunningham |
| 6,390,312 | B1 | | 5/2002 | Bean |
| 6,467,117 | B1 | | 10/2002 | Lantz et al. |
| 6,478,528 | B1 | | 11/2002 | Asbury |
| 6,481,587 | B2 | | 11/2002 | Higgins |
| 6,547,507 | B1 | | 4/2003 | Gest et al. |
| 6,578,722 | B2 | | 6/2003 | Perkins et al. |
| 6,586,084 | B1 | | 7/2003 | Paschke et al. |
| 6,821,075 | B2 | | 11/2004 | van der Horn |
| 6,826,452 | B1 | | 11/2004 | Holland et al. |
| 6,830,423 | B1 | | 12/2004 | Williams et al. |
| 6,981,834 | B1 | | 1/2006 | Henry |
| 7,114,690 | B2 | | 10/2006 | Bissen |
| 7,156,246 | B2 | | 1/2007 | Sherrod |
| 7,363,875 | B2 | | 4/2008 | Vetesnik |
| 7,537,088 | B2 | | 5/2009 | Spitsbergen |
| 7,604,134 | B2 | * | 10/2009 | Lichinchi ................ B66C 19/02 104/126 |
| 7,604,450 | B1 | | 10/2009 | Calvery |
| 7,607,546 | B1 | | 10/2009 | Hopper |
| 7,699,292 | B2 | | 4/2010 | Barnett |
| 7,789,356 | B1 | * | 9/2010 | Jones ..................... F16M 11/16 248/178.1 |
| 7,828,116 | B2 | | 11/2010 | Vetesnik |
| 8,397,320 | B2 | * | 3/2013 | Capaldi ................. A61G 7/1015 5/83.1 |
| 8,526,802 | B1 | * | 9/2013 | Starns ................... G03B 17/561 248/464 |

(56) References Cited

U.S. PATENT DOCUMENTS

| | | | |
|---|---|---|---|
| 8,646,629 B2 | 2/2014 | Paschke | |
| 8,684,136 B2 | 4/2014 | Chilton | |
| 8,727,146 B2* | 5/2014 | Radmall | B66C 15/00 |
| | | | 212/271 |
| 8,739,990 B2* | 6/2014 | Radmall | B66C 19/02 |
| | | | 212/294 |
| 8,793,822 B2* | 8/2014 | Martin | A61G 7/1019 |
| | | | 5/81.1 R |
| 8,985,354 B2* | 3/2015 | Lecours | B66C 13/18 |
| | | | 212/276 |
| 9,016,029 B2 | 4/2015 | Wagner | |
| 9,069,101 B2 | 6/2015 | Arroyo, Jr. et al. | |
| 9,073,734 B1 | 7/2015 | Cates et al. | |
| 9,096,413 B2* | 8/2015 | Gryzan | B66C 23/24 |
| 9,140,401 B2* | 9/2015 | Hoyle | F16M 11/00 |
| 9,194,977 B1* | 11/2015 | Dungan | G01C 25/00 |
| 9,206,020 B2* | 12/2015 | Waisanen | B66C 17/00 |
| 9,314,652 B2* | 4/2016 | Broadley | A62B 1/06 |
| 9,339,110 B2* | 5/2016 | deRoy VanZuydewyn | |
| | | | A47B 37/04 |
| 9,434,134 B2* | 9/2016 | Mizrahi | B23K 11/11 |
| 9,453,608 B2* | 9/2016 | Hoyle | A47B 3/06 |
| 9,522,810 B2* | 12/2016 | Chou | B66C 17/00 |
| 9,592,998 B2* | 3/2017 | Pilgrim | B66C 19/005 |
| 2002/0066710 A1 | 6/2002 | Spitsbergen | |
| 2002/0145088 A1* | 10/2002 | Santoro | A47B 9/04 |
| | | | 248/188.2 |
| 2003/0131682 A1 | 7/2003 | Crane et al. | |
| 2005/0161422 A1 | 7/2005 | Boily | |
| 2006/0124570 A1 | 6/2006 | Slobogean et al. | |
| 2006/0163186 A1 | 7/2006 | Choate et al. | |
| 2008/0053946 A1 | 3/2008 | Choate et al. | |
| 2008/0110844 A1* | 5/2008 | Lewis | B66C 13/48 |
| | | | 212/285 |
| 2009/0127424 A1 | 5/2009 | Ly et al. | |
| 2010/0051765 A1 | 3/2010 | Alvarez Hernandez | |
| 2010/0230559 A1* | 9/2010 | Eder | B66B 31/00 |
| | | | 248/157 |
| 2011/0061336 A1 | 3/2011 | Thomas | |
| 2011/0127229 A1* | 6/2011 | Laliberte | B25J 9/026 |
| | | | 212/312 |
| 2012/0138559 A1 | 6/2012 | Huff et al. | |
| 2013/0037768 A1 | 2/2013 | Hayes | |
| 2013/0075353 A1 | 3/2013 | Thompson | |
| 2013/0270354 A1 | 10/2013 | DuBose, Jr. et al. | |
| 2013/0284688 A1 | 10/2013 | Narcisco | |
| 2015/0110243 A1 | 4/2015 | Morton et al. | |
| 2015/0307337 A1 | 10/2015 | Ewert | |
| 2015/0351377 A1 | 12/2015 | DuBose et al. | |
| 2017/0197333 A1* | 7/2017 | Barnes | B28B 17/009 |

FOREIGN PATENT DOCUMENTS

| | | |
|---|---|---|
| FR | 2730481 | 8/1996 |
| GB | 2408038 | 5/2005 |
| WO | 2012058476 | 5/2012 |

OTHER PUBLICATIONS

Duttton-Lainson electric winch with Quick-Release Holes, published online at least as early as Dec. 1, 2009, available at http://www.dutton-lainson.com/drawings/DD_SA9000-12000.PDF, last accessed Jan. 7, 2014.

Thern Series 5124 Portable Davit Crane Brochure, published online at least as early as Jul. 20, 2012, available online at http://www.jherbertcorp.com/Series5124Davit_UpTo2k.pdf, last accessed Jan. 10, 2014.

* cited by examiner

PORTABLE GANTRY CRANE FORMED OF COMPOSITE MEMBERS

CROSS REFERENCE TO RELATED APPLICATIONS

This document is a divisional application of U.S. Utility patent application Ser. No. 14/168,696, filed Jan. 30, 2014, titled "Portable Crane Formed of Composite Members," listing as first inventor Steve Napieralski, now pending, which claims the benefit of the filing date of U.S. Provisional Patent Application 61/776,018, entitled "Portable Davit Crane Constructed of Composite Structural Members," listing as first inventor Matthew Robert Benson, filed Mar. 11, 2013, the disclosures of each of which are hereby incorporated entirely herein by reference.

BACKGROUND

1. Technical Field

Aspects of this document relate generally to cranes. More specific implementations involve davit cranes and gantry cranes.

2. Background Art

Cranes are used in many industries for a variety of applications. Cranes are used to hold, lift, or lower loads and/or to move loads to another location. Various types of cranes exist, such as overhead or bridge cranes, mobile (such as truck-mounted) cranes, side-lift cranes, rough terrain cranes, all terrain cranes, pick and carry cranes, carry deck cranes, crawler cranes, railroad cranes, and the like. Many cranes operate with a winch and/or with a wire, rope, chain or other device which sits in a sheave or other loop or device for lowering or lifting a load.

SUMMARY

Implementations of portable gantry cranes (cranes) formed of composite members may include: an I-beam formed of a composite material; two or more support members formed of a composite material, each support member supporting the I-beam when the portable gantry crane is in an upright position; and two or more end housings, each end housing enclosing a top end of one of the two or more support members and coupled thereto with an adhesive.

Implementations of portable gantry cranes (cranes) formed of composite members may include one, all, or any of the following:

A plurality of latch structures may be coupled with the I-beam, each latch structure having a latch, and each end housing having a latch receiver, each latch in combination with a latch receiver allowing one of the latch structures to be releasably fixedly coupled with an end housing.

A plurality of latch structures may be coupled with the I-beam, each latch structure including a latch structure enclosure, each latch structure enclosure at least partially enclosing one of the end housings.

A plurality of latch structures may be coupled with the I-beam, each latch structure having a plurality of pin receivers (latch structure pin receivers) aligned with a plurality of pin receivers of an end housing (end housing pin receivers), each latch structure pin receiver and each end housing pin receiver receiving a pin to selectively secure the latch structure to the end housing.

Each end housing may include a plurality of plates, the plurality of plates having a plurality of protrusions and a plurality of depressions, the plurality of plates organized in a way that each of the protrusions is aligned with and received by one of the depressions.

A plurality of latch structures may be coupled with the I-beam, each latch structure including a latch and a latch lock, the latch lock configured to selectively lock the latch in an open (unlatched) configuration.

A plurality of latch structures may be coupled with the I-beam, each latch structure including a latch and a latch lock, the latch lock configured to selectively lock the latch in a closed (latched) configuration.

Implementations of portable gantry cranes (cranes) formed of composite members may include: an I-beam formed of a composite material; two or more support members formed of a composite material, each support member supporting the I-beam when the portable gantry crane is in an upright position; two or more end housings, each end housing at least partially enclosing a top end of one of the two or more support members, and; one of a plurality of pins and a plurality of latches configured to releasably secure the two or more support members with the I-beam.

Implementations of portable gantry cranes (cranes) formed of composite members may include one, all, or any of the following:

Each end housing may be coupled with the top end of one of the two or more support members using an adhesive.

At least one pin and at least one latch may releasably secure each support member with the I-beam.

Each support member may be coupled with at least two legs.

Each support member may be coupled with the at least two legs with a leg coupler using pins placed in pin receivers in the leg coupler which line up with pin receivers in the support member.

Each support member may include at least one height adjuster configured to allow a height of the support member relative to the at least two legs to be adjusted.

A caster may be coupled with each leg.

A trolley may be coupled with the I-beam and configured to roll along the I-beam, the trolley including a coupler configured to receive a load.

Implementations of portable gantry cranes (cranes) formed of composite members may include: an I-beam formed of a composite material; two or more support members formed of a composite material, each support member supporting the I-beam when the portable gantry crane is in an upright position, each support member coupled with at least two legs, and; two or more end housings, each end housing at least partially enclosing a top end of one of the two or more support members; wherein each support member includes at least one height adjuster configured to allow a height of the support member relative to the at least two legs to be adjusted.

Implementations of portable gantry cranes (cranes) formed of composite members may include one, all, or any of the following:

A trolley may be coupled with the I-beam and configured to roll along the I-beam, the trolley including a coupler configured to receive a load.

Each end housing may be coupled with the top end of one of the two or more support members using only an adhesive.

Each support member may include a plurality of height adjusters configured to allow the height of the support member relative to the at least two legs to be adjusted to a plurality of positions, and the plurality of height adjusters may include a plurality of pin holes formed in the support member.

Each of the two or more end housings may include a plurality of injection openings through which an adhesive may be injected to bond the end housing to the top end of one of the support members after the end housing is coupled over the top end of the support member.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended portable cranes formed of composite members will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such portable cranes formed of composite members, and implementing components and methods, consistent with the intended operation and methods.

Referring now to FIGS. 1-6, in implementations a portable crane 2 includes a boom 8 formed of a composite material and a mast 6 also formed of a composite material. A boom end housing 10 forms an enclosure 14 which receives a first end 16 of the boom 8. In implementations the boom end housing 10 forms a rectangular tube 30 and receives the first end 16 in a tight friction-fit though, in other implementations, the boom 8 may be loosely coupled within the boom end housing 10 until secured in some manner. In either case, an adhesive is applied between the boom 8 and the boom end housing 10 through injection openings 86 to bond the two together. In various implementations a winch 74 is coupled to a top of the boom end housing 10 using a winch housing 70 having slots 79 or a winch housing 72 having quick-release slots 82. A cable 182 extends from the winch 74 and extends around the sheave 44 to be able to be coupled to a load using the coupler 184.

In implementations the winch 74 may be any winch sold by Dutton-Lainson Company of Hastings, Nebr., some of which have integral quick-release slots 82 in the winch or winch housing. In implementations the winch 74 may be, by non-limiting example, a brake winch, an electric winch, a pulling winch, a worm gear winch, and the like. In implementations the winch 74 may have various safety features, such as features preventing the winch 74 from being overloaded, Weston-style load brake features, features to prevent a load from being lifted in reverse (such as by preventing backwards re-spooling of the cable 182 when the winch 74 is run after the load has been fully lowered), and the like.

An end cap 32 is positioned at a second end 34 of the boom 8. A collar 50 is positioned at an end of a main member 52 of the boom 8. A boom pivot 18 couples the boom 8 to the top 12 of the mast 6 and allows the boom 8 to pivot relative to the mast 6, as indicated by the difference in angle of the boom 8 relative to the mast 6 between FIG. 1 and FIG. 2. An angle adjuster 20 is coupled to the boom end housing 10 and to a sleeve 48 and is configured to releasably secure the boom 8 at a desired angle relative the mast 6. The mast 6 in implementations is removably coupled within a base 170 which has several bolt holes 178 to be coupled to a floor or other stationary or moving item.

In implementations the mast 6 may be made of fiberglass reinforced polyester resin. In implementations the resin may be pigmented any desirable color. In implementations the mast 6 may have the shape of a right circular hollow cylinder with an outer diameter of about 3.57 inch and an about 0.5 inch wall thickness. In implementations the main member 52 of the boom 8 may be formed of a fiberglass reinforced urethane resin having the shape of a square tube having an outer side measurement of about 4 inch. The urethane resin may be pigmented any desirable color. In implementations the main member 52 may have a wall thickness of about 0.25 inch. In various implementations the extension 53 of the boom 8 may be formed of a fiberglass reinforced polyester resin having the shape of a square tube having an outer diameter of about 3.5 inch. In implementations the extension 53 may be sized to have a tight, though still manually slidable, fit within the main member 52. In implementations the extension 53 may be pigmented any desirable color.

In implementations all of the composite-material components could be made of fiberglass reinforced polyester resin, or fiberglass reinforced urethane resin. In implementations higher strength fibers may be utilized to make stronger and lighter portable cranes 2 and portable gantry cranes 4.

The base 170 has several cable holes 180 configured for storage of the cable 182. In the implementations shown the cable holes 180 have a key-hole shape. In implementations such cable holes 180 could also be included on the drum of the winch 74. The cable holes 180 are for use with cables 182 that have a ball end swaged onto the end of the cable 182 or other ball or other element with a diameter larger than the cable 182 otherwise coupled to the cable 182. To attach the cable 182 to the drum of the winch 74 instead of bolting the bare end of the cable 182 to the drum one may, in implementations, drop the ball end of the cable 182 through a cable hole 180 in the drum and crank a few wraps of cable 182 onto the drum. In implementations this allows the cable 182 to be installed quickly. In implementations the uninstallation is also quick as the cable 182 may be brought to a slack state and the ball end slid out of the cable hole 180 in the drum.

Once the cable 182 is removed from the drum of the winch 74 it may be drawn through the sheave 44 and the ball end may be inserted into a cable hole 180 in the base 170 for storage. This may be useful in implementations such as, by non-limiting example, submersible pump removal usage, where the cable 182 may often remain attached to the pump, so in practice a user may just hook the cable 182 to the winch 74 to draw the pump up to service the pump and then, when the service is complete, the pump may be lowered back down, the cable 182 removed from the winch 74 and coupled again to the cable hole 180 of the base 170. In such implementations there may be a stationary base 170 at each location where there are one or more pumps that will regularly need to be serviced (and each base 170 may, for example, be bolted to some stationary surface), and the mast 6 of the portable crane 2 may be removed from one base 170 and carried by hand to the next base 170 to perform service on the next pump or set of pumps, with the cable(s) 182 of the next pump(s) already coupled to the cable holes 180 of the next base 170.

In implementations the cable 182 is a ¼-inch wire rope. In implementations the winch 74 may be configured to accept either swaged ball ends or bare end cable. In implementations the length of the boom 8 may be altered using the extension 53 from about 32 inches to about 60 inches. In implementations the mast 6 may have an outer diameter of about 3.5 inches. In implementations the portable crane 2 may have a height from the bottom of the base 170 to the top of the boom end housing 10 of about 55 inches. In implementations the portable crane 2 may have a height from the bottom of the base 170 to the end of the boom 8, when the boom 8 is fully extended and adjusted to its highest angle relative to the mast 6 using the angle adjuster 20, of about 101 inches. In implementations the portable crane 2 may include an external handle that helps a user to rotate the portable crane 2 under a load. In implementations a single person may be able to fully assemble the portable crane 2 without the use of any tools because of the features described herein.

In implementations the mast 6 may have one or more holes at a bottom of the mast 6 which expose the inside of the mast 6 to the outside environment. These holes may be used for drainage, such as to allow water or other fluids or materials which enter the inside of the mast 6 to exit out the bottom of the mast 6.

At a top of the base 170 a bushing 176 couples between the mast 6 and the base 170. In implementations the bushing 176 may be used to hold the mast 6 in a snug configuration relative to the base 170. In particular implementations the bushing 176 is a self-lubricating component. By non-limiting example, the bushing 176 may be formed of a molybdenum disulfide ($MoS_2$) material sold under the trade name NYLATRON by Quadrant EPP USA, Inc. of Reading, Pa. In implementations the bushing 176 may be press-fit into the base 170 and may not be bonded or otherwise adhered or fixed to the base 170 or the mast 6.

In implementations a pin 68 removably couples the angle adjuster 20 to the sleeve 48. In implementations the boom pivot 18 has an extension 128 sized and shaped to fit within the top 12 of the mast 6. In various implementations the extension 128 may have a tight fit within the mast 6, and in other implementations it may be somewhat loose. In particular implementations the extension 128 may be secured to the mast 6 such as with an adhesive, bolts, and/or the like, such as to make the extension 128 permanently secured to the mast 6.

Figure 1:
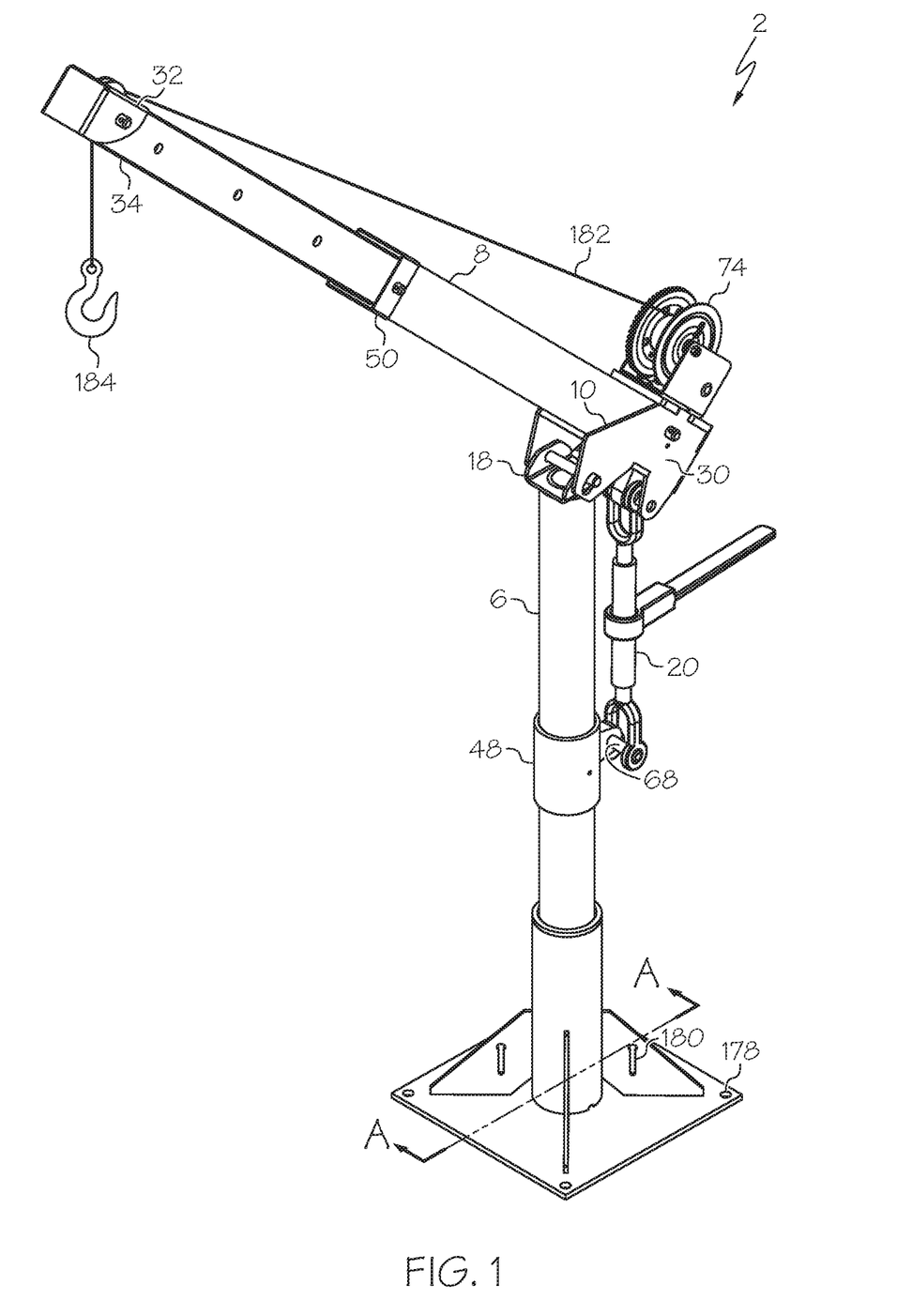
FIG. 1 is a side perspective view of an implementation of a portable crane.
Figure 2:
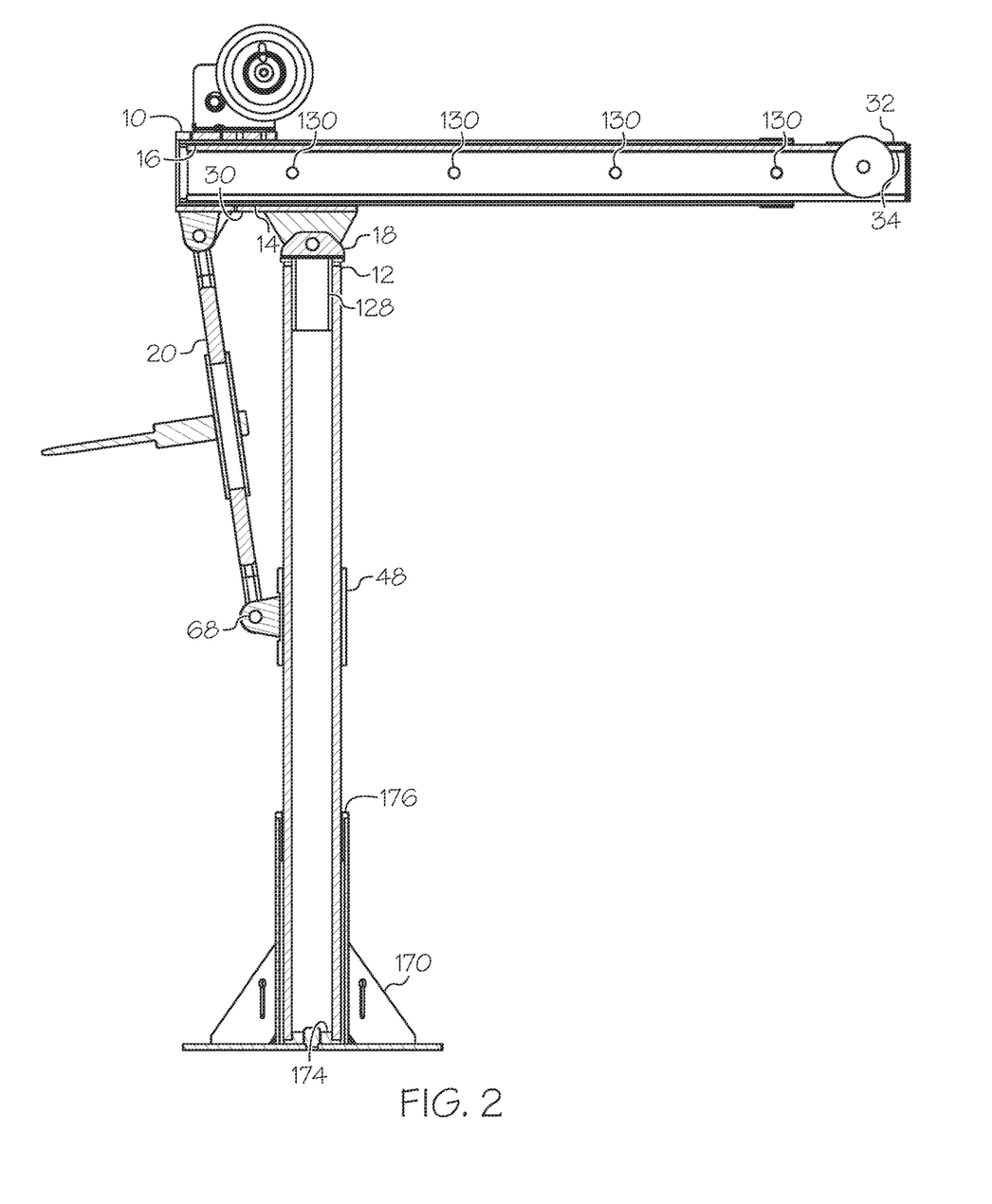
FIG. 2 is a side cross sectional view of the portable crane of FIG. 1 taken along sectional line A-A with the boom lowered to a lower position and the boom not fully extended.

In implementations a plurality of length adjusters 130 of the extension 53 of the boom 8 allow the boom 8 to be set to various lengths, such as with a pin that is placed through the pin receiver 54 of the collar 50 and through the length adjusters 130 at the desired position. In this way the length of the boom 8 may be varied anywhere between a fully extended position, as seen in FIG. 1, and a fully contracted position, as seen in FIG. 2. In implementations the boom 8 could exclude the extension 53 and the end cap 32 and sheave 44 could be incorporated into the end of the main member 52, and in such implementations if desired the length of the main member 52 could be increased. In implementations the collar 50 may prevent the main member 52 of the boom 8 from delaminating over time.

In implementations the sheave 44 may be sized to receive the cable 182 that is being used, or to conform to industry standards, and the like. The gaps around the sheave 44 or, in other words, the distances between the sheave 44 and the edges of the slots 84 and 85 may be designed with sufficiently small tolerances that if the cable 182 jumps or otherwise exits the sheave 44 it will be prevented from being wedged into one of these gaps.

In implementations the angle adjuster 20 couples to the boom end housing 10 with a pin 66 (see FIG. 4A) and couples to the sleeve 48 with a pin 68. In implementations the angle adjuster 20 is a ratchet screw jack, though in implementations it could be some other device or mechanism. In implementations the angle adjuster 20 may be used to raise the boom 8 to lift a load before, during, or after the load has been (or is being) lifted with the winch 74. By non-limiting example, in implementations the winch 74 of a portable crane 2 may be used to lift some object, such as an A/C compressor off of a boat or other vehicle, with the boom 8 in a 90-degree configuration relative to the mast 6. Then, when the load is raised up close to the boom 8, the boom 8 may need to be raised further to be able to rotate the portable crane 2 so that the load will clear some wall or other obstruction to be able to lower the load to a desired location. Thus the angle adjuster 20 may be used for this purpose while the load is coupled to the portable crane 2. In implementations though, as explained, this adjustment of the angle of the boom 8 could be done before the load is lifted. In implementations the angle adjuster 20 locks the angle in place such that the angle of the boom 8 relative to the mast 6 generally will not change without the user engaging the angle adjuster 20 for that purpose.

Referring to FIG. 2, in implementations there is a mast bottom cap 174 at a bottom of the mast 6. In implementations this is a self-lubricating component that assists in allowing the mast 6 to freely rotate within the base 170 with little friction. In implementations a plurality of holes may be included in the mast bottom cap 174 so that, for example, the mast 6 could be placed on a structure with a plurality of pins aligned with the plurality of holes so as to intentionally prevent the mast 6 from spinning relative to the base 170 or other components, where a lack of rotation is desirable. For example, in implementations the portable crane 2 may be used with a portable rolling base (such as an engine hoist) and the rotation of the portable crane 2 may need to be eliminated (for instance, it is possible that otherwise the portable crane 2 could swing beyond the perimeter of the legs of the portable rolling base and fall over. In implementations grease or some other lubricant may be applied to the bottom of the mast bottom cap 174 to reside between the mast bottom cap 174 and the base 170 to further reduce friction. A thin washer of self-lubricating plastic may also be added here between the mast bottom cap 174 and the base 170 such as, by non-limiting example, a component containing NYLATRON like that previously mentioned.

In implementations the boom 8 and mast 6 are formed of composite materials and several of the other components are formed of other materials. For example, referring to FIG. 3, in implementations the boom end housing 10, sleeve 48, collar 50 and end cap 32 may be made of a metal, such as a steel. In particular implementations they may be formed of zinc-plated steel, though they could be formed of aluminum or any other metal or other material. In various implementations these components could themselves be formed of a composite material or a ceramic material. In implementations the boom end housing 10 is a weldment formed of several individual pieces such as a substantially rectangular top section 22, a substantially rectangular back section 29, two side sections 26 and a substantially rectangular bottom section 24. In implementations the boom end housing 10, sleeve 48, collar 50 and end cap 32 may each be sized to have a tight tolerance fit with the boom 8 or mast 6, as the case may be. This may allow for less adhesive to be used between the parts and may allow the bond line thickness to be tailored to a desired amount.

In various implementations a corrosion-resistant powder coating may be used on any of the steel components. In other implementations it may be advantageous to instead use zinc plating on the steel components. The zinc plating may offer protection on both the outside and the inside of the steel components. The zinc plating may prevent bond line corrosion from small amounts of water migrating through the bond line between a steel component and a composite material member bonded together with a urethane based adhesive. In various implementations the boom end housing 10 is secured to the boom 8 only through the use of an adhesive. In implementations the sleeve 48 is secured to the mast 6 only through the use of an adhesive. In both cases this may eliminate some structural issues that could be present with holes and fasteners that would otherwise be used to secure the elements together.

In implementations any of the boom end housing 10, sleeve 48, collar 50 and/or end cap 32 may be formed of a mild steel, such as steels of the grades A36, A1018, A1020, and the like according to standards established by ASTM International of West Conshohocken, Pa., though in other implementations stronger alloy steels may be used for thinner, lighter components of equivalent strengths.

With regards to the injection openings 86, 88, 90, 92, in implementations these may allow for even dispersion of an adhesive between bonding surfaces. In various implementations the viscosity of the adhesive and other variables, such as tolerance between bonding surfaces, may be varied to achieve as close to 100% bonding surface between the bonded components as possible. Various methods may be utilized to inject adhesive into the injection openings 86, 88, 90, 92, including using a manually actuated cartridge gun (such as something similar to a caulk gun), a pneumatic cartridge gun, and/or other pneumatic or hydraulically actuated devices, processes and techniques.

Figure 3:
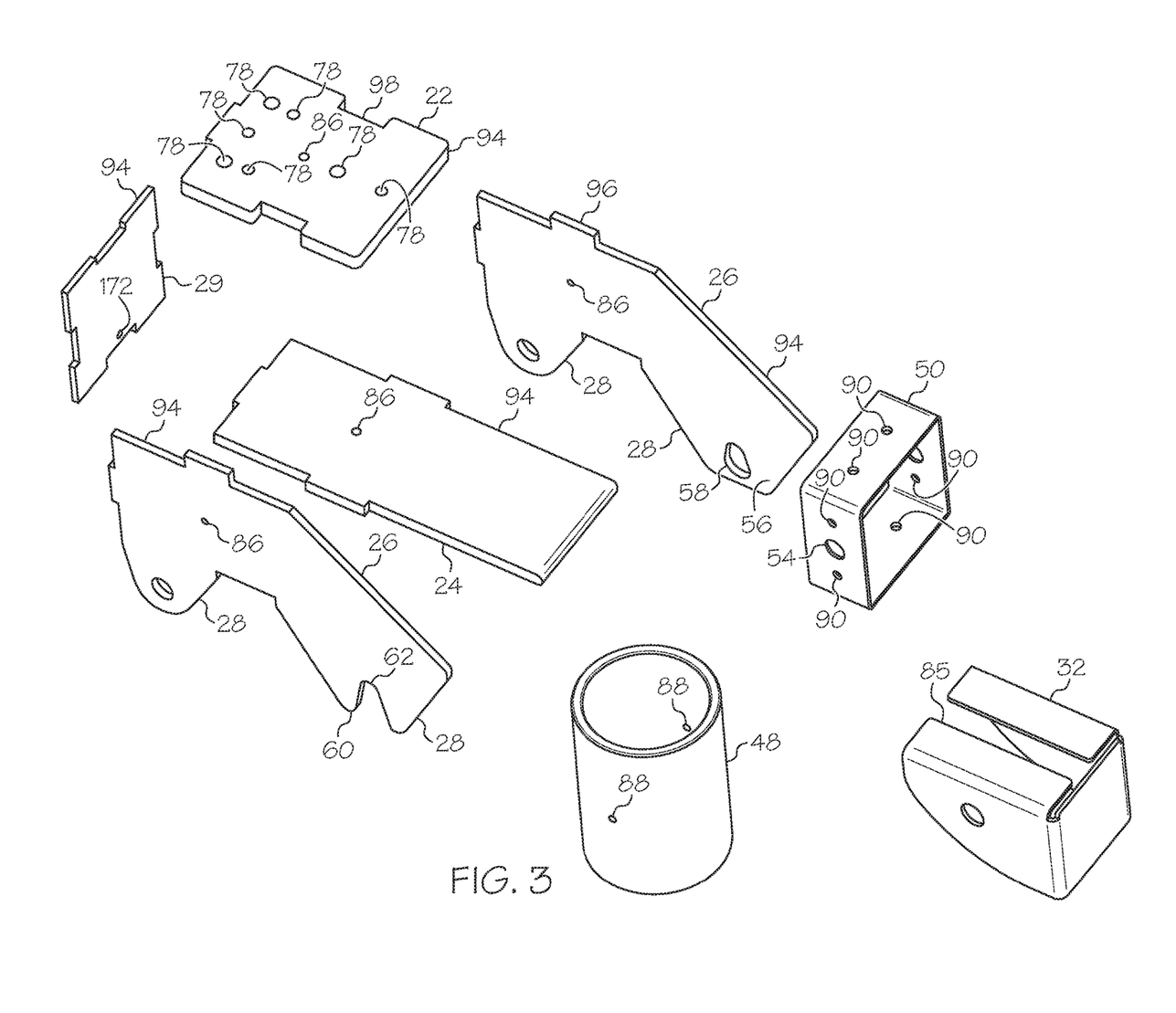
FIG. 3 is a top perspective view of several plates of a boom end housing, a collar, a sleeve, and an end cap of the portable crane of FIG. 1.

Referring still to FIG. 3, in implementations the side sections 26 each have a plurality of pin-receiving projections 28. A sidewall 56 of the boom end housing 10 includes a first opening 58 and a peripheral edge 60 of the boom end housing 10 forms a slot 62 and the first opening 58 and slot 62 together receive a pin 64 of the boom pivot 18. In various implementations the pin 64 is a welded component of the boom pivot 18 such that it is secured thereto. The boom pivot 18, in combination with other elements, may allow a quick connection and removal of the boom 8 to and from the mast 6. By non-limiting example, in implementations when the boom 8 is being installed, the first opening 58 may be positioned with the pin 64 therein and then the boom 8 may be rotated such that the slot 62 rests down upon the pin 64. At this point gravity may hold the boom 8 to the mast 6 while the user continues with further assembly. During assembly, when the user couples the angle adjuster 20 to the boom end housing 10 with the pin 66 and couples the angle adjuster 20 to the mast 6 with pin 68, the angle adjuster 20 then restricts the degree of motion of the boom 8 so that it cannot rotate in such a way that it can be removed from off of the pin 64. The boom 8 is thus locked into place. In implementations this may allow, or may help, a single person to assemble and disassemble the portable crane 2 without the assistance of other persons.

In implementations a drainage hole 172 is included in a back of the boom end housing 10 so that, if the boom 8 is stored in an upright position (i.e., with the sheave end upwards), then any water or other liquids collecting in the hollow boom 8, such as rain, may drain out through the drainage hole 172.

Referring still to FIG. 3, in various implementations the boom end housing 10 is formed of several plates 94 and the several plates 94 include several protrusions 96 and depressions 98 such that, when the plates 94 are placed together in their intended configuration, each depression 98 receives a protrusion 96. This may help to place the plates 94 together and hold them in their intended configuration, for instance, while the plates 94 are being welded together (if metal) or otherwise secured together. This may also allow the tolerance between the boom end housing 10 and the boom 8 to be highly controlled without using any special tooling or fixtures during the welding stage. In implementations the plates 94, including the protrusions 96 and depressions 98, may be formed with high tolerance laser cutting for more precision.

Figure 5:
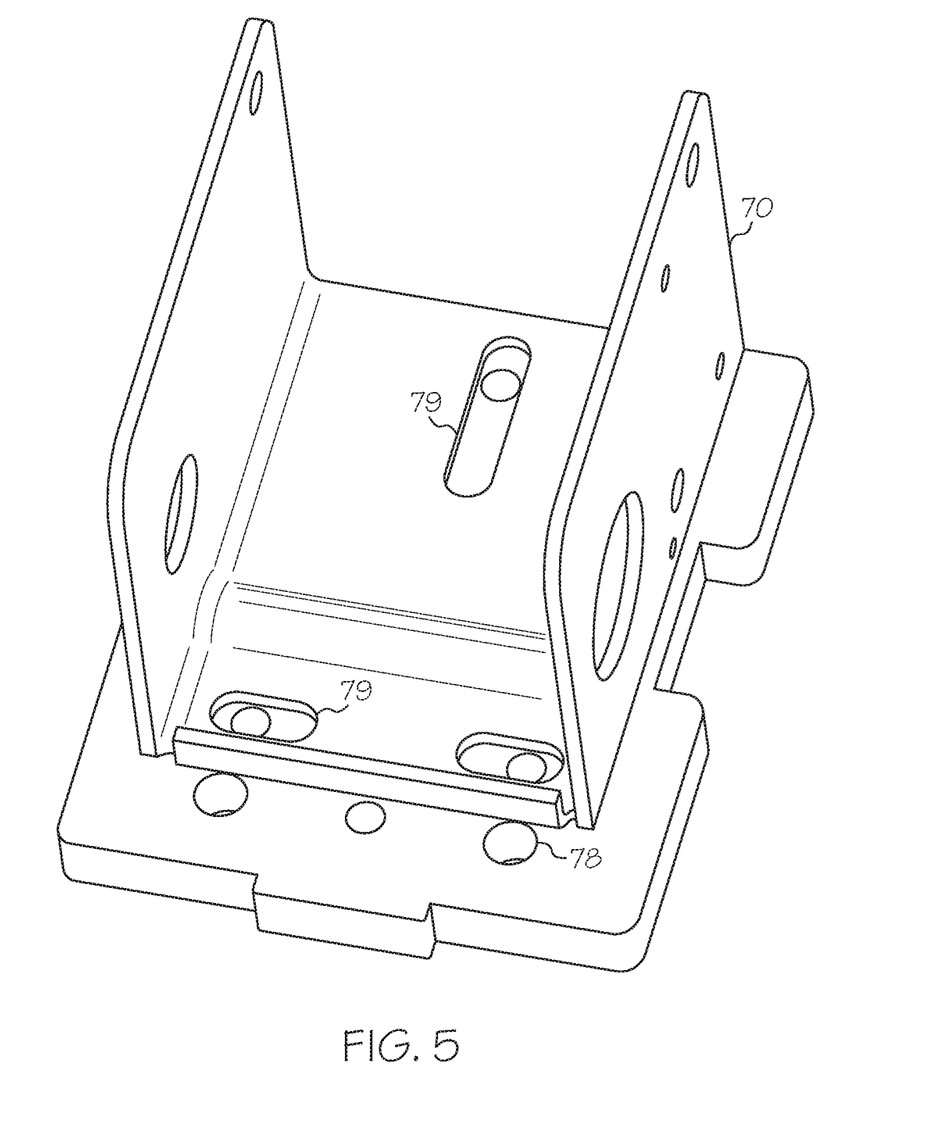
FIG. 5 is a top perspective view of a winch housing and a substantially rectangular top section of a boom end housing of the portable crane of FIG. 1.
Figure 6:
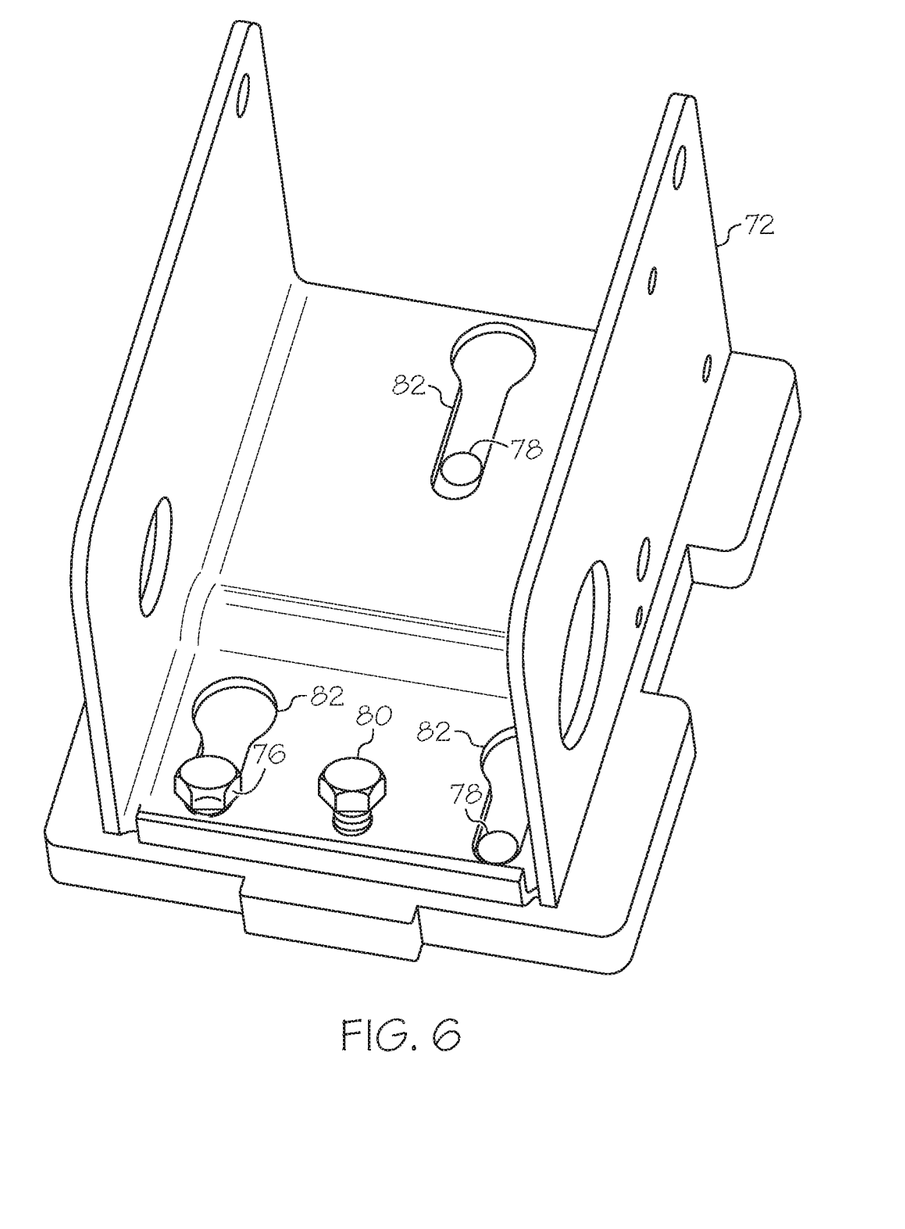
FIG. 6 is a top perspective view of another implementation of a winch housing and a substantially rectangular top section of a boom end housing.

Referring to FIG. 3, the substantially rectangular top section 22 includes several bolt holes 78. Referring to FIG. 5, in implementations a winch housing 70 may have slots 79 that align with the bolt holes 78 in order to secure the winch housing 70 to the boom end housing 10. Referring to FIG. 6, in implementations a winch housing 72 may include quick-release slots 82 which align with the bolt holes 78. Bolts 76 which correspond with the quick-release slots 82 may be kept intentionally loose so that the winch housing 72 may be slid into place and then, once the bolts 76 are in the narrow portion of the quick-release slots 82 such as to prevent an upwards movement of the winch housing 72 from the boom end housing 10, a securing bolt 80 may be inserted into one of the bolt holes 78 to prevent a lateral movement of the winch housing 72 relative to the boom end housing 10, thus locking the winch housing 72 in a secure configuration. When it is desired to remove the winch housing 72, the securing bolt 80 may alone be removed, and then the winch housing 72 may be slid laterally such that the wide ends of the quick-release slots 82 are aligned with the heads of the bolts 76, thereby allowing the winch housing 72 to be moved upwards to remove it from the boom end housing 10. Such a mechanism may be useful, for example, with electric winches which, in implementations, may be secured to the boom end housing 10 with bolts 76 that are difficult to access once the electric winch is in close proximity with the boom end housing 10.

Referring now to FIG. 3, in implementations the sleeve 48 has a plurality of injection openings 88 through which an adhesive may be injected after the sleeve 48 is placed on the mast 6 so as to bond the sleeve 48 to the mast 6. In implementations the sleeve 48 may be formed of zinc-plated steel.

The collar 50 in implementations has a plurality of injection openings 90 though which an adhesive may be injected after the collar 50 has been placed on an end of the main member 52 of the boom 8 so as to bond the collar 50 to the boom 8. The collar 50 includes pin receivers 54 to receive a pin which locks the extension 53 at a desired position relative to the main member 52. The end cap 32 has a slot 85 which aligns, generally, with the slot 84 (see FIGS. 4A and 4B) of the boom 8.

Figure 4A:
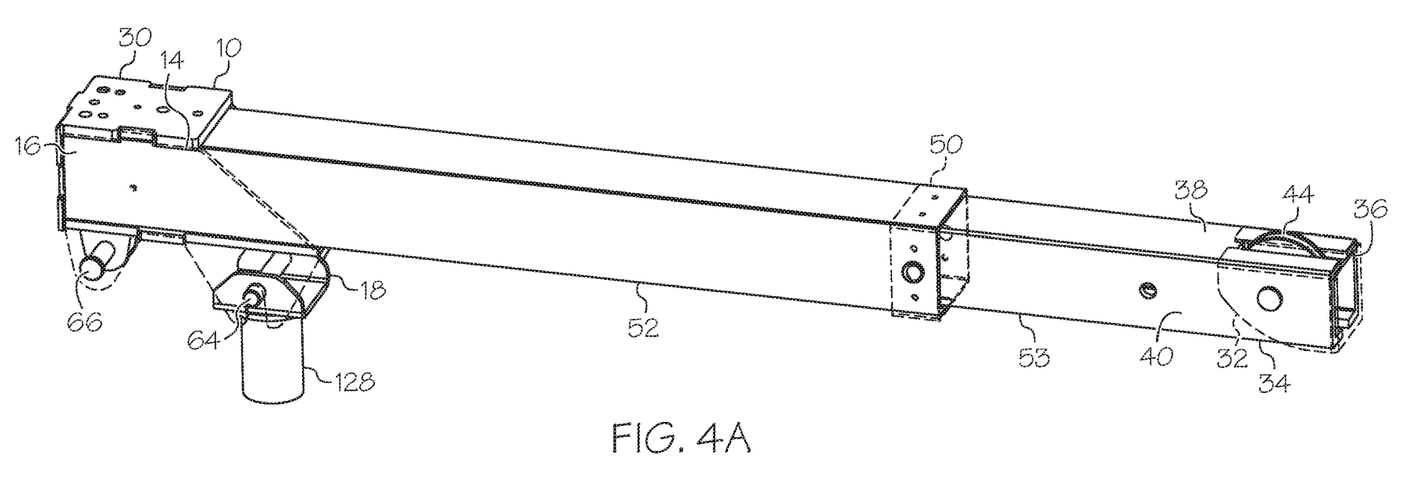
FIG. 4A is a side perspective partial-see-through view of several components of the portable crane of FIG. 1.
Figure 4B:
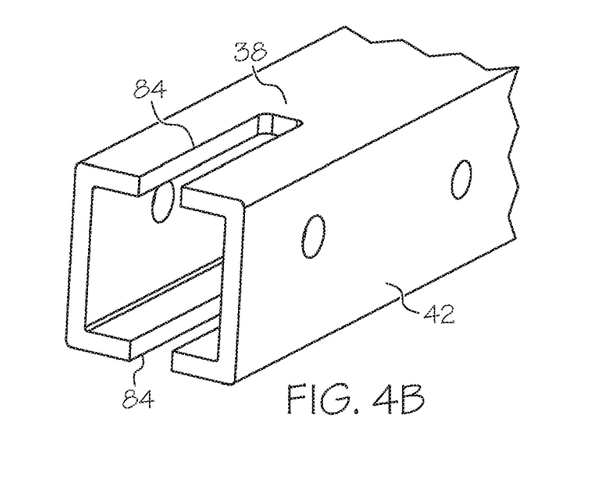
FIG. 4B is a close-up side perspective view of a portion of an extension of a boom of the portable crane of FIG. 1.

Referring to FIGS. 4A and 4B, in implementations the boom end housing 10 couples to the boom pivot 18 with a pin 64 and the sheave 44 couples to the end cap 32 with a pin 46. In implementations the end cap 32 covers all or, in implementations, substantially all or, in particular implementations, a majority of a terminal end 36 of the second end 34 of the boom 8. In implementations the end cap 32 covers a portion of an upper surface 38, a first side 40 and a second side 42 of the second end 34. In implementations the sheave 44 is positioned in the slots 84 of the boom 8 and in the slot 85 of the end cap 32, which are generally aligned with each other. In implementations, as shown in the drawings, the end cap 32 extends along both sides of the top slot 84.

The various pins disclosed herein may include any type of pin including, by non-limiting example, a ball lock pin, a detent pin, a Clevis pin, an L-pin, a T-pin, a jig pin, a clamping pin, an expanding pin, a cotter pin, a quick release pin, a cotterless pin, a toggle pin, a pin that is held in an installed configuration with a circular Cotter ring, and the like. The lengths and/or diameters of any of the pins may be varied as needed for increased strength, ease of removal and installation, and the like.

In implementations the various pins may allow the various components of the portable crane 2 to be de-coupled from one another for easy transportation or storage, and then re-assembled at an end location.

In implementations the portable crane 2 may be configured to lift loads up to 1,000, 1,100 and/or 1,200 lbs. In implementations the winch 74 may be designed to make it difficult to lift loads up to the maximum capacity to reduce the likelihood of overloading the portable crane 2.

In various implementations the elements of a portable crane 2 that are formed of composite materials may make the crane more portable than other cranes by significantly reducing the weight of the parts of the crane. By non-limiting example, some metal davit cranes that are indicated as being portable may still weigh as much as around 150 lb., making it hard for a single person to carry all of the components of the crane in one trip even if the crane can be disassembled. In contrast, in various implementations the portable crane 2 formed of composite members may weigh about 75 lbs., making it much more likely that a single person could carry all of the components of the crane in one trip. In implementations the mast 6 may be rotatable in the base 170 a full 360 degrees. When a winch housing 72 with quick-release slots 82 is used this may further contribute to the portability of the portable crane 2 since the winch 74 may weigh several pounds and being able to quickly remove it and then quickly reinstall can assist in transportation. Being able to remove the winch 74 and/or winch housing 70 or 72 may also make it less likely that any damage happens to the composite members in transit.

In implementations the boom end housing 10 may be configured to receive the shape of the boom 8. By non-limiting example, in implementations the boom 8 and boom end housing 10 could both have a circular shape, or an oval shape, or elliptical, and so forth, instead of the rectangular shape which is shown in the drawings.

Referring now to FIGS. 7-10, in various implementations a portable gantry crane 4 includes an I-beam 108 and at least two support members 110. In implementations, each support member 110 is coupled to at least two legs 136 with a leg coupler 138. In implementations this is accomplished with pins 140 placed in pin receivers in the leg coupler 138 which line up with pin receivers in the legs 136. In implementations each support member 110 includes a plurality of height adjusters 144 which, in implementations, are pin receivers, allowing the height of each support member 110 to be adjusted, and allowing the support member 110 to be otherwise coupled to the leg coupler 138, using pins 142. In implementations a caster 132 is coupled to each leg 136 with a caster end cap 134 which is configured to receive the leg 136. A trolley 146 slides or rolls along the I-beam 108 and includes a coupler 148 designed to receive a load.

Figure 7:
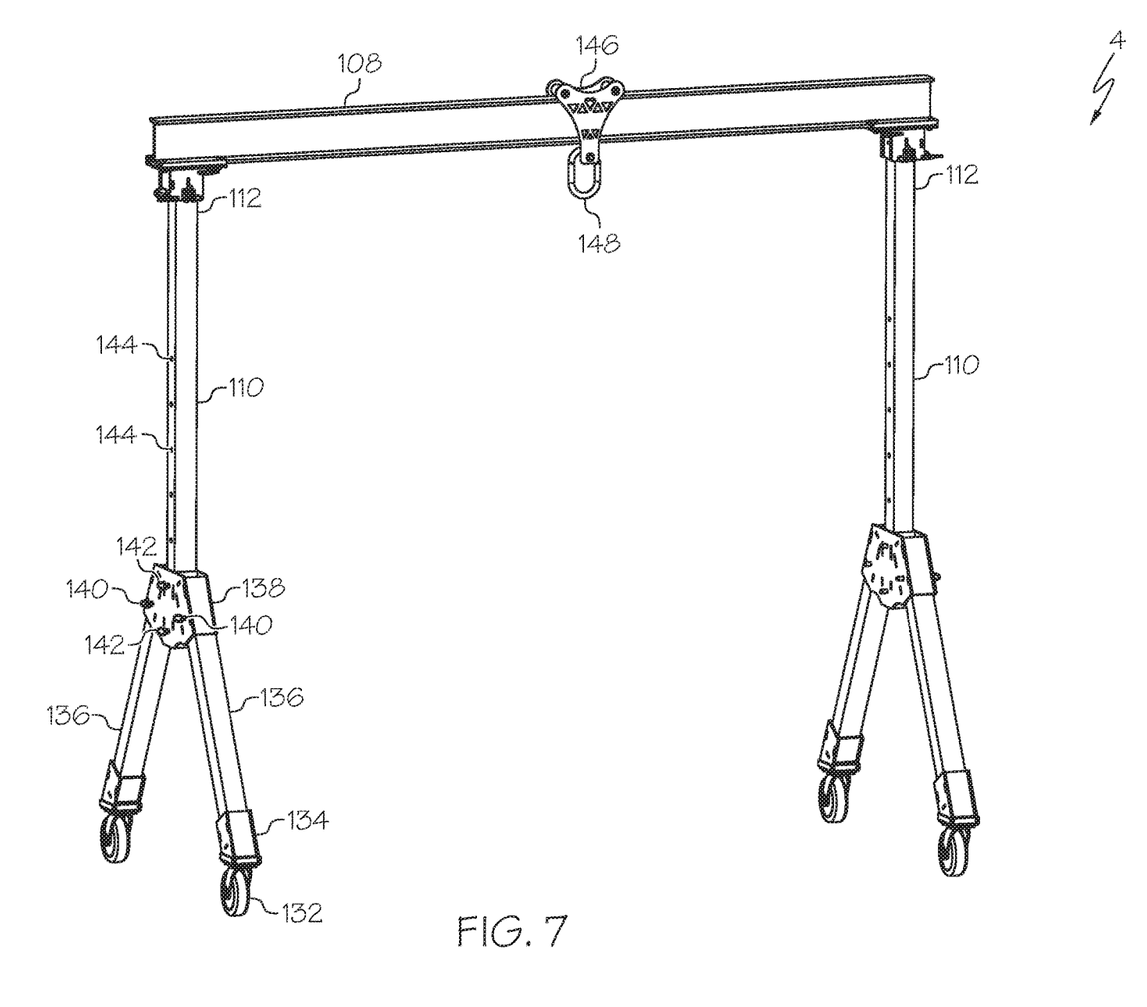
FIG. 7 is a side perspective view of a portable gantry crane.
Figure 8:
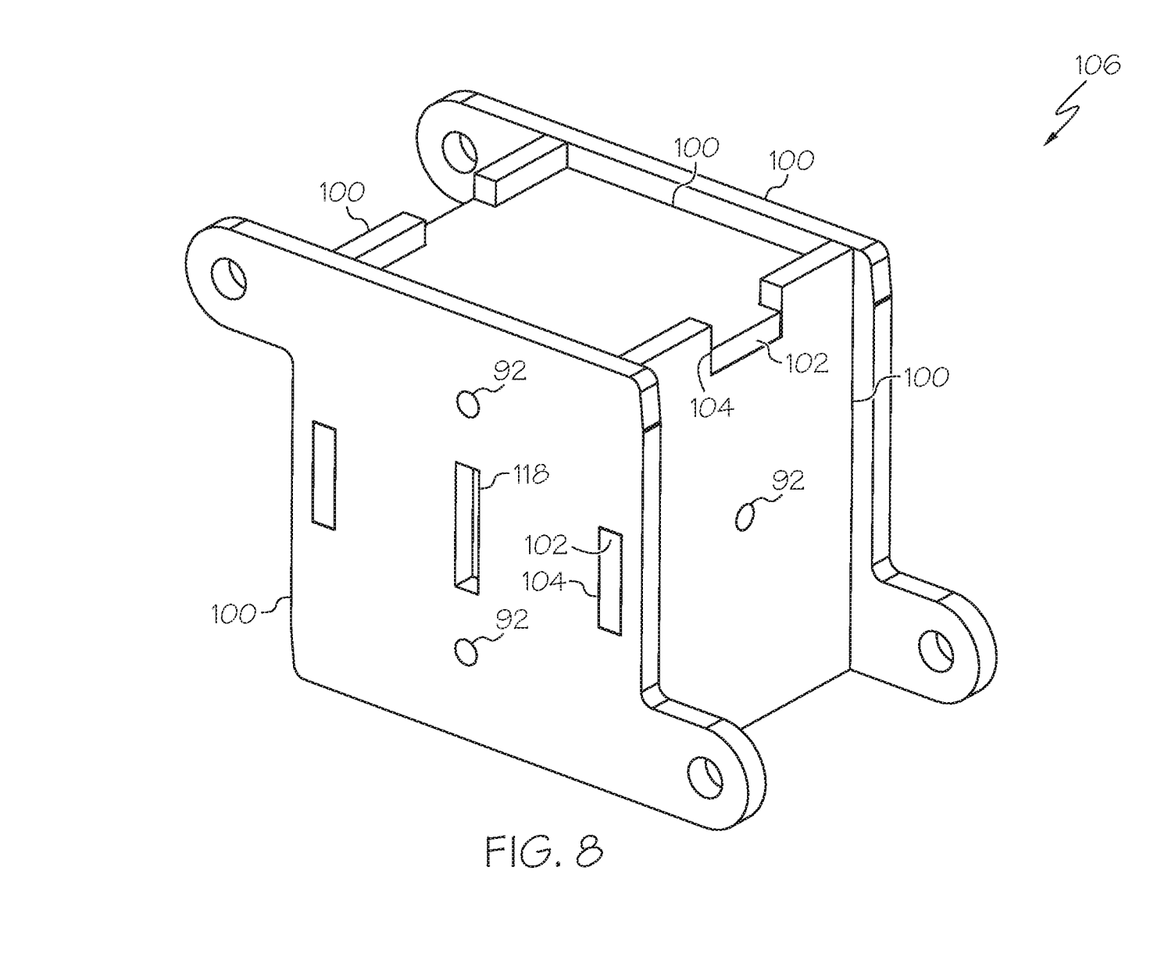
FIG. 8 is a side perspective view of an end housing of the portable gantry crane of FIG. 7.

Referring to FIGS. 7 and 8, in implementations the portable gantry crane 4 includes a plurality of end housings 106, each end housing 106 forming an enclosure that receives and encloses a top end 112 of a support member 110. In implementations the end housing 106 forms the shape of a rectangular tube with one end closed. The end housing 106 includes a plurality of plates 100. Each plate 100 is a flat, or substantially flat, member and includes a substantially rectangular shape. The plates 100 include a plurality of protrusions 102 and a plurality of depressions 104 such that, when the plates 100 are placed together in a configuration to form the end housing 106, each protrusion 102 is received by one of the depressions 104. This may help to place the plates 100 together and hold them in their intended configuration, for instance, while the plates 100 are being welded together (if metal) or otherwise secured together. This may also allow the tolerance between the end housing 106 and the top end 112 to be highly controlled without using any special tooling or fixtures during the welding stage. In particular implementations the plates 100, including the protrusions 102 and depressions 104, may be formed with high tolerance laser cutting for more precision. In various implementations each end housing 106 includes a plurality of injection openings 92 through which an adhesive may be injected to bond the end housing 106 to the top end 112 of a support member 110. In particular implementations each end housing 106 is secured to a top end 112 using only an adhesive. In implementations each plate 100 has a substantially flat, substantially rectangular shape.

Figure 9:
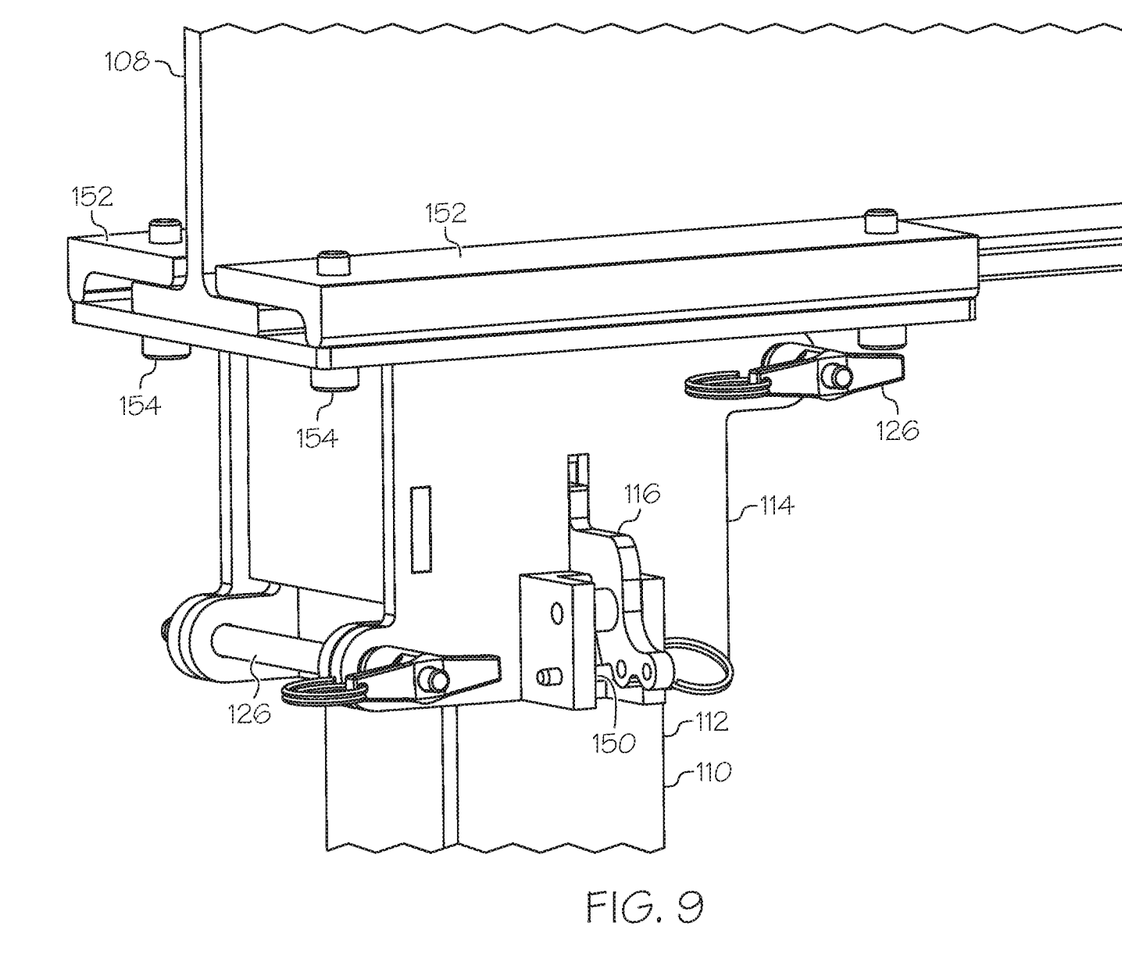
FIG. 9 is a close-up side perspective view of several components of the portable gantry crane of FIG. 7.
Figure 10:
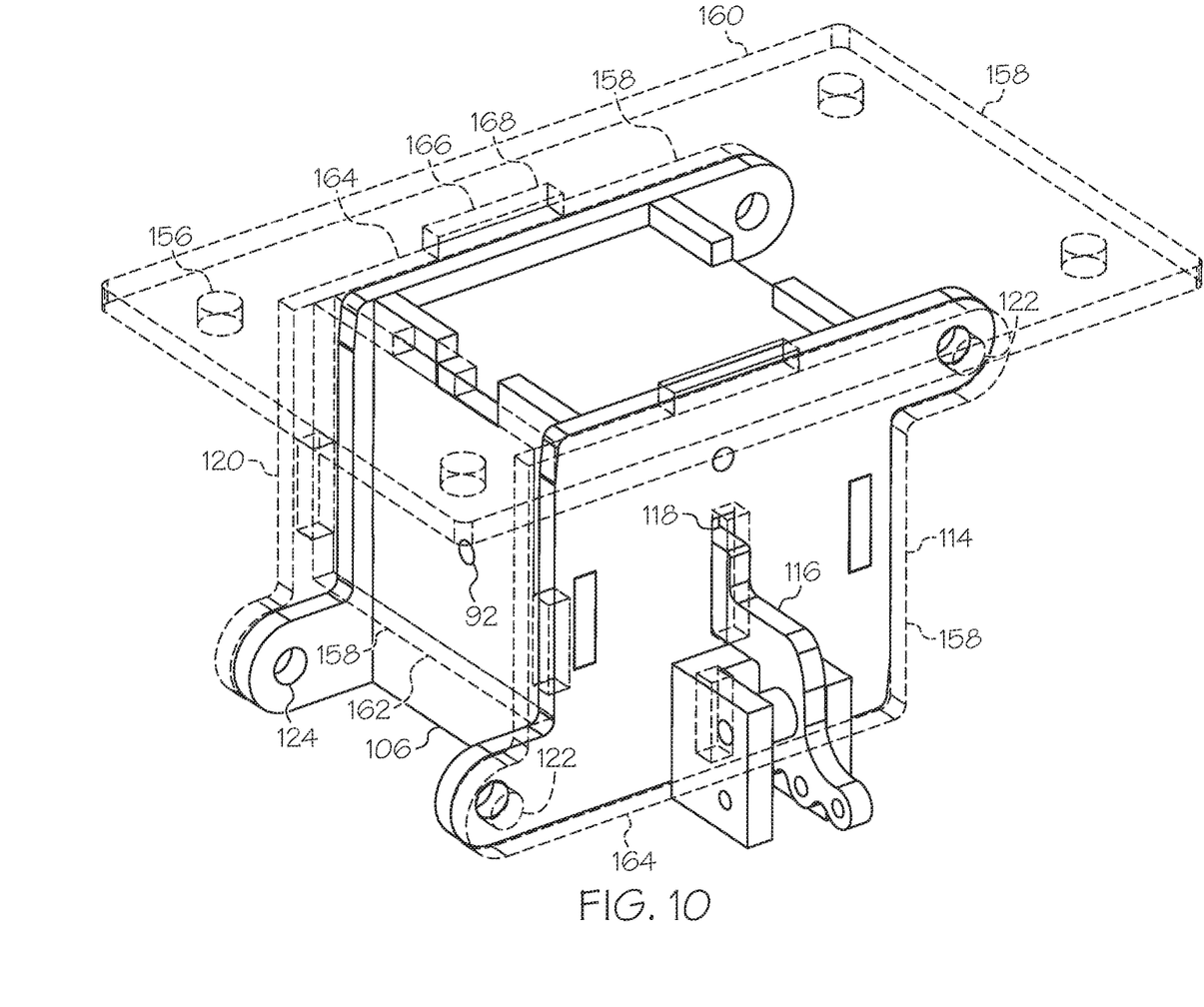
FIG. 10 is a partial-through view of a latch structure and an end housing of the portable gantry crane of FIG. 7.

Referring now to FIGS. 8-10, in implementations a latch structure 114 is coupled to the I-beam 108. In implementations there is a latch structure 114 associated with each support member 110 so that the I-beam 108 may be latched to, and unlatched from, each support member 110. The latch structure 114 in implementations forms a latch structure enclosure 120 that receives and/or partially encloses an end housing 106, as seen in FIG. 10. In implementations each latch structure 114 is formed of a plurality of plates 158 including a top plate 160, back plate 162, and side plates 164. In implementations the plates 158 include a plurality of protrusions 166 and depressions 168 such that, when the plates 158 are placed together in the configuration forming the latch structure 114, each protrusion 166 is received by a depression 168. This may facilitate easier welding of the plates 158 by allowing a welder to use the geometry of the plates 158 to assemble the latch structure 114 prior to welding. This may also allow the tolerance between the latch structure 114 and the end housing 106 to be highly controlled without using any special tooling or fixtures during the welding stage. In implementations the plates 158, including the protrusions 166 and depressions 168, may be formed with high tolerance laser cutting for more precision. The latch structure 114 in implementations includes one or more I-beam couplers 152 coupled to the top plate 160 using bolts 154 placed through bolt holes 156. The I-beam couplers 152 couple the latch structure 114 to the I-beam 108.

In implementations the latch structure 114 includes a plurality of pin receivers (latch structure pin receivers) 122 and the end housing 106 includes a plurality of pin receivers (end housing pin receivers) 124. In implementations the latch structure pin receivers 122 and end housing pin receivers 124 are configured to align with one another to receive pins 126 to selectively secure the latch structure 114 to the end housing 106, as seen in FIGS. 9 and 10. Each latch structure 114 in implementations includes at least one latch 116, and in implementations two latches 116 (one on each side plate 164), configured to align with a latch receiver 118 of the end housing 106 (which may have one latch receiver 118 in one plate 100 and one latch receiver 118 in an opposing plate 100), to selectively secure the latch structure 114 to the end housing 106. In implementations a latch lock 150 locks the latch 116 in a closed configuration to prevent the latch 116 from exiting the latch receiver 118 until the latch lock 150 is placed in an unlocked configuration. In the implementation shown in FIG. 9 the latch lock 150 is a pin which locks the latch 116 to a closed configuration when desired. In various implementations the latch lock 150 may also lock the latch 116 in an open configuration, such as by placing the pin in a different groove of the latch lock 150 which holds the latch 116 in an open configuration.

In implementations of a portable crane 2 or a portable gantry crane 4, all sharp corners of any metal or other components that meet a composite-material member that will be loaded in flexure may be blunted. Over the long term this design may prevent or slow down failure due to cyclic loading. In various implementations sharp corners that are not necessary on laser-cut components may be filleted. This may increase manufacture speed, thus decreasing cost, and may otherwise reduce the likelihood of fatigue failure of components.

In various implementations any of the adhesives may be a methyl methacrylate based adhesive. In other implementations any of the adhesives may be a urethane based adhesive. In implementations a urethane based adhesive may increase performance and reduce odor and have improve handling and curing over a methyl methacrylate based adhesive.

In implementations the portable gantry crane 4 formed of composite members may be more portable than other gantry cranes due to the lightweight nature of its composite members and due to the ability of the I-beam 108 to be decoupled from each of the support members 110.

In implementations one or more or all of the caster end caps 134, leg couplers 138, end housings 106 and latch structures 114 may be formed of aircraft grade aluminum. In implementations one or more or all of these elements may be formed of steel. In implementations the casters 132 may have a locking mechanism whereby they may be selectively prevented or hindered from rolling/rotating. In implementations the trolley 146 may have a locking mechanism whereby the trolley 146 may be selectively prevented or hindered from rolling or sliding along the I-beam 108. In implementations the portable gantry crane 4 may be configured to be set up on site without tools by a single person. In implementations the portable gantry crane 4 may have a capacity of 2,000 lb., a width of about 8 feet, and height positions ranging from about 8 feet to about 5 feet 6 inch. In implementations the I-beam 108, support members 110 and legs 136 may be formed of any of the composite materials disclosed herein, including but not limited to fiberglass reinforced polyester resin, fiberglass reinforced urethane resin, and the like. In implementations the portable gantry crane 4 may weigh about ⅓ the weight of an equivalent-sized gantry crane that has an I-beam and support members formed of steel.

Implementations the composite members of either the portable crane 2 or portable gantry crane 4 may include any matrix materials and any reinforcing materials presently known or hereafter discovered.

In places where the description above refers to particular implementations of a portable crane formed of composite members and implementing components, sub-components, methods and sub-methods, it should be readily apparent that a number of modifications may be made without departing from the spirit thereof and that these implementations, implementing components, sub-components, methods and sub-methods may be applied to other portable cranes formed of composite members.

What is claimed is:

1. A portable gantry crane formed of composite members, comprising:
    an I-beam formed of a composite material;
    two or more support members formed of a composite material, each support member supporting the I-beam when the portable gantry crane is in an upright position;
    a plurality of latch structures coupled with the I-beam, each latch structure comprising a latch; and
    two or more end housings each comprising a latch receiver configured to receive the latch, each end housing enclosing a top end of one of the two or more support members and coupled thereto with an adhesive;
    wherein each latch structure comprises a plurality of pin receivers (latch structure pin receivers) aligned with a plurality of pin receivers of an end housing (end housing pin receivers), wherein one of the two or more support members are configured to hingedly rotate relative to the I-beam when a single pin is received in one of the plurality of pin receivers.

2. The crane of claim 1, wherein the plurality of latch structures at least partially enclose the two or more end housings.

3. The crane of claim 1, wherein each end housing comprises a plurality of plates, the plurality of plates comprising a plurality of protrusions and a plurality of depressions, the plurality of plates organized in a way that each of the protrusions is aligned with and received by one of the depressions.

4. The crane of claim 1, each latch structure further comprising a latch lock, the latch lock configured to selectively lock the latch in an open configuration.

5. The crane of claim 1, each latch structure further comprising a latch lock, the latch lock configured to selectively lock the latch in a closed configuration.

6. The crane of claim 1, wherein the latch is configured to extend through an opening in a sidewall of the latch structure and be received within the latch receiver.

7. A portable gantry crane formed of composite members, comprising:
- an I-beam formed of a composite material;
- two or more support members formed of a composite material, each support member supporting the I-beam when the portable gantry crane is in an upright position;
- two or more end housings, each end housing at least partially enclosing a top end of one of the two or more support members;
- a plurality of pins configured to releasably secure the two or more support members with the I-beam; and
- at least one latch releasably securing each support member with the I-beam, wherein each support member is configured to hingedly rotate about one of the plurality of pins.

8. The crane of claim 7, wherein each end housing is coupled with the top end of one of the two or more support members using an adhesive.

9. The crane of claim 7, wherein each support member is coupled with at least two legs.

10. The crane of claim 9, wherein each support member is coupled with the at least two legs with a leg coupler using pins placed in pin receivers in the leg coupler which line up with pin receivers in the support member.

11. The crane of claim 9, wherein each support member includes at least one height adjuster configured to allow a height of the support member relative to the at least two legs to be adjusted.

12. The crane of claim 9, further comprising a caster coupled with each leg.

13. The crane of claim 7, further comprising a trolley coupled with the I-beam and configured to roll along the I-beam, the trolley including a coupler configured to receive a load.

14. A portable gantry crane formed of composite members, comprising:
- an I-beam formed of a composite material;
- two or more support members formed of a composite material, each support member supporting the I-beam when the portable gantry crane is in an upright position, each support member coupled with at least two legs;
- two or more end housings, each end housing at least partially enclosing a top end of one of the two or more support members; and
- a plurality of latch structures coupled to the I-beam, each latch structure comprising a latch configured to extend through an opening in the latch structure and releasably lock the latch structure to one of the two or more end housings.

15. The crane of claim 14, further comprising a trolley coupled with the I-beam and configured to roll along the I-beam, the trolley including a coupler configured to receive a load.

16. The crane of claim 14, wherein each end housing is coupled with the top end of one of the two or more support members using only an adhesive.

17. The crane of claim 14, wherein each support member includes a plurality of height adjusters configured to allow a height of the support member relative to the at least two legs to be adjusted to a plurality of positions, and wherein the plurality of height adjusters includes a plurality of pin holes formed in the support member.

18. The crane of claim 14, wherein each of the two or more end housings includes a plurality of injection openings through which an adhesive may be injected to bond the end housing to the top end of one of the support members after the end housing is coupled over the top end of the support member.

* * * * *